United States Patent Office 3,142,693
Patented July 28, 1964

3,142,693
ARYLOXYETHYL ESTERS OF DIALLYLTHIO-
CARBAMIC ACIDS
Anton G. Weiss, Nitro, W. Va., and Philip C. Hamm,
Webster Groves, Mo., assignors to Monsanto Company,
a corporation of Delaware
No Drawing. Filed Oct. 7, 1959, Ser. No. 844,872
7 Claims. (Cl. 260—455)

The present invention relates to new compounds and more particularly to aryloxyethyl esters of diallylthiocarbamic acids.

The compounds of the present invention may be represented by the general formula

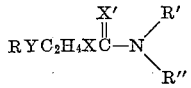

where R represents phenyl or halogen substituted phenyl, Y represents oxygen or sulfur, X and X' represent oxygen or sulfur at least one of which is sulfur and R' and R" represent allyl or chloroallyl. Typical examples of the preferred compounds comprise 2-(phenylthio)ethyl, 2 - (phenoxy)ethyl, 2 - (p - chlorophenylthio)ethyl, 2-(p-chlorophenoxy)ethyl, 2-(p-bromophenylthio)ethyl, 2-(p-bromophenoxy)ethyl, 2-(2,4-dichlorophenylthio)ethyl, 2 - (2,4 - dibromophenylthio)ethyl, 2 - (2,4 - dichlorophenoxy)ethyl, 2-(2,4-dibromophenoxy)ethyl, 2-(2,4,5-trichlorophenylthio)ethyl and 2-(2,4,5-trichlorophenoxy)ethyl esters of diallyldithiocarbamic acid, diallylthiolcarbamic acid and diallylthionocarbamic acid.

Although other methods of preparation are suitable, such thiocarbamates may be conveniently obtained by converting diallylamine to a thiocarbamic acid and condensing the diallylthiocarbamic acid with the halide containing the desired ether substituent. As an illustration of a satisfactory procedure, 23 grams (0.3 mole) of carbon bisulfide was added dropwise with stirring to 68 grams (0.7 mole) of diallylamine dissolved in 150 ml. of dimethyl formamide, the mixture being kept at 20–25° C. during the addition. Then 56 grams (0.3 mole) of p-chlorophenoxyethyl chloride was added in one portion and the mixture stirred for 5 hours at 60–70° C. After cooling to room temperature, 250 ml. of water were added to the product and the water solution extracted with 250 ml. of ether. The organic layer which separated was washed with 300 ml. of water and dried over sodium sulfate. The solvent was removed by stripping at 90–100° C. (14 mm. pressure). The 2-(p-chlorophenoxy)ethyl diallyldithiocarbamate, obtained in theory yield, was an amber oil analyzing 4.6% nitrogen, 10.9% chlorine and 19.8% sulfur as compared to 4.3% nitrogen, 10.8% chlorine and 19.6% sulfur calculated for $C_{15}H_{18}ClNOS_2$.

Employing the same reaction conditions and replacing the p-chlorophenoxyethyl chloride with an equimolar amount of the appropriate halide, further examples of the products of this invention were prepared possessing the following physical properties:

2 - (2,4 - dichlorophenoxy)ethyl diallyldithiocarbamate, a dark amber oil, in 100% theory yield.

2-(phenylthio)ethyl diallyldithiocarbamate, a dark amber oil, in 100% theory yield. Analysis gave 5.1% nitrogen and 31.4% sulfur compared to 4.5% nitrogen and 31.7% sulfur calculated for $C_{15}H_{19}NS_3$.

2-(phenoxy)ethyl diallyldithiocarbamate, a dark amber oil, in 100% theory yield. Analysis gave 5.3% nitrogen and 22.6% sulfur compared to 4.8% nitrogen and 21.9% sulfur calculated for $C_{15}H_{19}NOS_2$.

2 - (2,4,5 - trichlorophenoxy)ethyl diallyldithiocarbamate, an amber oil, in 90% theory yield. Analysis gave 3.9% nitrogen, 16.4% sulfur and 24.1% chlorine compared to 3.5% nitrogen, 16.2% sulfur and 26.8% chlorine calculated for $C_{15}H_{16}Cl_3NOS_2$.

2-(p-bromophenoxy)ethyl diallyldithiocarbamate, an amber oil, in 99% theory yield. Analysis gave 4.2% nitrogen, 17.3% sulfur and 20.6% bromine compared to 3.8% nitrogen, 17.2% sulfur and 21.5% bromine calculated for $C_{15}H_{18}BrNOS_2$.

2-(p-chlorophenylthio)ethyl diallyldithiocarbamate, a dark amber oil.

A glass reaction vessel was charged with 33.2 grams (0.2 mole) of di(2-chloroallyl)amine, 120 grams of dimethyl formamide and 30 ml. of triethylamine. To this was added 17 grams of carbon disulfide at room temperature, addition being made over a period of about an hour. This was followed by addition of a phenetole reactant. The reaction mixture was heated at 60–70° C. for 5 hours, then cooled, 250 ml. of water added and the mixture extracted with ether. The ether extract was dried over sodium sulfate and volatiles removed by distillation at 90–100° C. under 12 mm. Hg pressure. The results are summarized below. All the products were amber liquids.

| Product | Yield, Percent | Phenetole Reacted |
|---|---|---|
| 2-(2,4-Dichlorophenoxy)ethyl bis(2-chloroallyl)dithiocarbamate. | 87.2 | β,2,4-trichlorophenetole. |
| 2-(2,4,5-Trichlorophenoxy)ethyl bis-(2-chloroallyl)dithiocarbamate. | 90.3 | β,2,4,5-tetrachlorophenetole. |
| 2-(Phenoxy)ethyl bis(2-chloroallyl)-dithiocarbamate. | 91.0 | β-chlorophenetole. |
| 2-(p-Bromophenoxy)ethyl bis(2-chloroallyl)dithiocarbamate. | 97.6 | β-chloro-p-bromophenetole. |
| 2-(Phenylthio)ethyl bis(2-chloroallyl)dithiocarbamate. | 95.3 | β-chlorothiophenetole. |
| 2-(2,4,6-Trichlorophenoxy)ethyl bis-(2-chloroallyl)dithiocarbamate. | 79.7 | β,2,4,6-tetrachlorophenetole. |

A solution of 14.7 grams (0.15 mole) of monochloroacetic acid in 50 ml. of water was carefully neutralized with 10.4 grams of potassium carbonate. The solution was cooled to 5° C. and added in one portion to 0.15 mole of a potassium xanthate from an alcohol containing the desired phenoxy ethyl group. The reaction mixture was stirred for one hour at room temperature and to it was then added 19.5 grams of diallylamine. Stirring was continued for 4 hours after which the reaction mixture was extracted with ether, the ether extracts dried over sodium sulfate and the ether removed in vacuo. Products obtained by this procedure after removing volatile constituents by heating to 90–100° C. under 12 mm. Hg pressure are summarized below:

| Product | Yield, Percent | Xanthate Reactant |
|---|---|---|
| 2-(Phenylthio)ethyl diallylthionocarbamate. | 87.6 | C₆H₅—SC₂H₄OC(=S)—SK |
| 2-(2,4,5-Trichlorophenoxy)ethyl diallylthionocarbamate. | 74.6 | (2,4,5-Cl₃C₆H₂)—OC₂H₄OC(=S)—SK |
| 2-(2,4-Dichlorophenoxy)ethyl diallylthionocarbamate. | 71.7 | (2,4-Cl₂C₆H₃)—OC₂H₄OC(=S)—SK |

Carbonoxysulfide (22.5 grams or 0.3 mole of 85% concentration) was added at 0–5° C. to 68 grams (0.7 mole) of diallylamine dissolved in 150 ml. of dimethyl formamide. Then 39.1 grams (0.25 mole) of β-chlorophenetole was added in one portion and the mixture heated at 60–70° C. for 5 hours. After cooling to 20–25° C., 250 ml. of water were added to the product and the water solution extracted with ether. The organic layer which separated was washed with water and dried over sodium sulfate. The solvent was removed by stripping at 90–100° C. at 14 mm. pressure. The 2-(phenoxy) ethyl diallylthiolcarbamate was obtained as an amber oil in 95.4% yield. Analysis gave 4.8% nitrogen and 12.5% sulfur compared to 5.1% nitrogen and 11.6% sulfur calculated for $C_{15}H_{19}NO_2S$.

Properties of other products obtained in similar manner are recorded below. They were all amber oils:

| Compound | Yield, percent | Analysis, percent | |
|---|---|---|---|
| | | Calcd. | Found |
| 2-(Phenylthio)ethyl diallylthiolcarbamate | 94.0 | N, 4.8<br>S, 21.9 | 4.1<br>23.2 |
| 2-(2,4,5-Trichlorophenoxy)ethyl diallylthiolcarbamate | 88.5 | N, 3.7<br>Cl, 27.9<br>S, 11.4 | 3.3<br>27.3<br>10.6 |
| 2-(2,4-Dichlorophenoxy)ethyl diallylthiolcarbamate | 98.3 | N, 4.1<br>Cl, 20.5<br>S, 9.3 | 4.1<br>20.1<br>10.0 |
| 2-(p-Chlorophenylthio)ethyl diallylthiolcarbamate | 97.8 | N, 4.3<br>Cl, 10.8<br>S, 19.6 | 4.3<br>10.9<br>20.4 |
| 2-(p-Chlorophenoxy)ethyl diallylthiolcarbamate | 100.0 | N, 4.5<br>Cl, 11.4<br>S, 10.3 | 4.4<br>11.6<br>11.5 |
| 2-(p-Bromophenoxy)ethyl diallylthiolcarbamate | 96.5 | N, 3.9<br>Br, 22.4<br>S, 12.5 | 3.7<br>22.5<br>10.1 |
| 2-(2,4,6-Trichlorophenoxy)ethyl diallylthiolcarbamate | 85.3 | N, 3.7<br>Cl, 27.9<br>S, 11.4 | 3.5<br>27.7<br>9.8 |

The new compounds exert significant biological activity. In general they are efficient herbicides which combine grass and broadleaf activity. They are particularly effective in pre-emergent application. Amounts within the range of 1 to 60 pounds per acre are adequate for most purposes. The toxicants may be applied in the form of a spray containing the active ingredient in a concentration within the range of 0.05–5.0%. While the active components are insoluble in water they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt thereof, alkali metal salts of sulfated fatty alcohols, ethylene oxide condensation products of alkyl phenols, tall oil, higher alcohols or higher mercaptans. The solid formulations or dusts may contain in addition to the active ingredient, diluents or extenders, preferably those which render the formulations permanently dry and free flowing. Effective solid diluents are clay, talc, pyrophyllite, silica and fuller's earth.

As illustrative of the herbicidal activity the ester was emulsified in water and the emulsion applied as a spray. In this manner the active ingredient was applied to the soil of seeded plots before any plants emerged. About fourteen days after application of the toxicants results were observed and recorded. The number of seeds emerging was converted to weighted herbicidal ratings based on average percent germination of any particular seed lot times an injury factor. This evens irregularities of ratings on seeds which may vary in percent germination. The injury factor takes into consideration any plants not expected to survive. Thus, phytotoxicity ratings are based on the number of plants which emerge and will survive as observed two weeks after planting. Herbicidal ratings were assigned by means of the following conversion scale:

| Percent emergence: | Phytotoxicity rating |
|---|---|
| 0–25 | 3 or severe. |
| 26–50 | 2 or moderate. |
| 51–75 | 1 or slight. |
| 76–100 | 0 or none. |

Table I

| Active Ingredient | Lbs./Acre | Results Observed |
|---|---|---|
| 2-(Phenoxy)ethyl diallylthiolcarbamate. | 25 | Severe phytotoxicity to a mixture of grasses, wild oat, rye grass, sugar beet, foxtail, crab grass, pigweed and sorghum; moderate phytotoxicity to brome grass. |
| 2-(Phenylthio)ethyl diallylthiolcarbamate. | 25 | Severe phytotoxicity to sugar beet and crab grass; moderate phytotoxicity to wild oats. |
| 2-(2,4,5-Trichlorophenoxy)ethyl diallylthiolcarbamate. | 5 | Severe phytotoxicity to morning glory, radish and pigweed; moderate phytotoxicity to a mixture of broadleaved plants, sugar beet and crab grass. |
| 2-(2,4-Dichlorophenoxy)ethyl diallylthiolcarbamate. | 5 | Severe phytotoxicity to wild oats, rye grass, radish, sugar beet, crab grass and wild buckwheat; moderate phytotoxicity to a mixture of grasses, a mixture of broadleaved plants, brome grass and pigweed. |
| 2-(p-Chlorophenoxy)ethyl diallylthiolcarbamate. | 25 | Severe phytotoxicity to a mixture of grasses, wild oats, brome grass, rye grass, foxtail, crab grass and sorghum; moderate phytotoxicity to radish and sugar beet. |
| 2-(p-Bromophenoxy)ethyl diallylthiolcarbamate. | 25 | Severe phytotoxicity to a mixture of grasses, a mixture of broadleaved plants, morning glory, wild oat, radish, sugar beet, crab grass, pigweed and soybean; moderate phytotoxicity to brome grass, rye grass, foxtail, wild buckwheat and tomato. |
| 2-(2,4,6-Trichlorophenoxy)ethyl diallylthiolcarbamate. | 25 | Severe phytotoxicity to a mixture of broadleaved plants, radish, sugar beet, crab grass, pigweed, wild buckwheat and tomato; moderate phytotoxicity to morning glory, rye grass and soybean. |

When tested at lower concentrations, 2-(phenoxy)ethyl diallylthiolcarbamate completely controlled crab grass at one pound per acre and was still very active on wild oats and brome grass.

Useful properties as contact herbicides are illustrated by applying the compounds in spray form to 21 day old specimens of a mixture of grasses and a mixture of broadleaved plants and observing the phytotoxicity. Typical results are recorded in Table II. The mixture of grasses is indicated as "Grass" and the mixture of broadleaved plants is indicated as "Broadleaf" in the table. A spray containing 0.5% of the active ingredient shown was applied:

Table II

| Active Ingredient | Phytotoxicity Rating | |
|---|---|---|
| | Grass | Broadleaf |
| 2-(2,4-Dichlorophenoxy)ethyl diallyl-thiolcarbamate | 2 | 3 |
| 2-(p-Chlorophenylthio)ethyl diallyl-thiolcarbamate | 2 | 2 |
| 2-(p-Bromophenoxy)ethyl diallyl-thiolcarbamate | 2 | 2 |

Table III further illustrates the pre-emergent herbicidal activity of typical compounds. The active ingredient was applied at a dosage of 25 pounds per acre to the soil of seeded plots before the grass or other plants emerged:

Table III

| Active Ingredient | Results Observed |
|---|---|
| 2-(p-Chlorophenoxy)ethyl diallyldithiocarbamate. | Severe phytotoxicity to radish and crab grass; moderate phytotoxicity to morning glory, sugar beet, foxtail, wild buckwheat, tomato and sorghum. |
| 2-(2,4-Dichlorophenoxy)ethyl diallyldithiocarbamate. | Severe phytotoxicity to morning glory, radish, sugar beet, foxtail, crab grass, pigweed, soybean and sorghum; moderate phytotoxicity to brome grass and tomato. |
| 2-(2,4,5-Trichlorophenoxy)ethyl diallyldithiocarbamate. | Severe phytotoxicity to morning glory, radish, sugar beet, pigweed tomato and sorghum; moderate phytotoxicity to wild oat, brome grass, foxtail, crab grass and wild buckwheat. |
| 2-(Phenoxy)ethyl diallyldithiocarbamate. | Severe phytotoxicity to wild oat and crab grass; moderate phytotoxicity to brome grass, sugar beet, soybean and tomato. |

Table IV illustrates pre-emergent herbicidal activity of typical compounds at 5 pounds per acre:

Table IV

| Active Ingredient | Results Observed |
|---|---|
| 2-(2,4,5-Trichlorophenoxy)ethyl diallythionocarbamate. | Severe phytotoxicity to morning glory, radish, sugar beet, crab grass, pigweed, wild buckwheat, tomato and soybean; moderate phytotoxicity to rye grass and sorghum. |
| 2-(2,4-Dichlorophenoxy)ethyl diallylthionocarbamate. | Severe phytotoxicity to morning glory, radish, sugar beet, crab grass, pigweed, wild buckwheat, tomato, sorghum and soybean; moderate phytotoxicity to brome-cheat grass. |
| 2-(2,4-Dichlorophenoxy)ethyl bis(2-chloroallyl)dithiocarbamate. | Moderate phytotoxicity to morning glory, radish, wild buckwheat and tomato. |

It is intended to cover all changes and modifications of the examples of the invention herein chosen for purposes of disclosure which do not constitute departures from the spirit and scope of the invention.

What is claimed is:
1. A compound of the structure

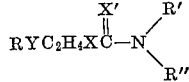

where R represents a member of the group consisting of phenyl and halogen substituted phenyl radicals containing at least one but not more than three halogen atoms selected from the group consisting of chlorine and bromine, Y, X and X' represent a member of the group consisting of oxygen and sulfur at least one of X and X' being sulfur and R' and R'' represent radicals selected from the group consisting of allyl and monochloro substituted allyl.

2. A compound of the structure

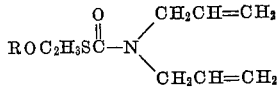

where R represents chlorophenyl containing at least one but not more than three chlorine atoms.

3. 2-(Phenoxy)ethyl diallylthiolcarbamate.
4. 2 - (2,4,5 - Trichlorophenoxy)ethyl diallylthiolcarbamate.
5. 2-(2,4-Dichlorophenoxy)ethyl diallylthiolcarbamate.
6. 2-(p-Chlorophenoxy)ethyl diallylthiolcarbamate.
7. 2-(p-Bromophenoxy)ethyl diallylthiolcarbamate.

References Cited in the file of this patent

UNITED STATES PATENTS

| | | |
|---|---|---|
| 2,060,733 | Hunt et al. | Nov. 10, 1936 |
| 2,160,880 | Loane et al. | June 6, 1939 |
| 2,396,789 | Hunt | Mar. 19, 1946 |
| 2,854,467 | Harman et al. | Sept. 30, 1958 |
| 2,863,899 | Harris | Dec. 9, 1958 |
| 2,876,088 | Hill et al. | Mar. 3, 1959 |
| 2,893,856 | Hamm | July 7, 1959 |